United States Patent
Gonzalez Castro et al.

(10) Patent No.: US 10,337,495 B2
(45) Date of Patent: Jul. 2, 2019

(54) SYSTEM AND METHOD FOR REDUCING VORTEX-INDUCED TOWER VIBRATIONS OF A WIND TURBINE

(71) Applicant: General Electric Company, Schenectady, NY (US)

(72) Inventors: Jorge Gonzalez Castro, Berlin (DE); Hubert Oing, Berlin (DE)

(73) Assignee: General Electric Company, Schenectady, NY (US)

( * ) Notice: Subject to any disclaimer, the term of this patent is extended or adjusted under 35 U.S.C. 154(b) by 464 days.

(21) Appl. No.: 15/158,639

(22) Filed: May 19, 2016

(65) Prior Publication Data
US 2017/0335823 A1  Nov. 23, 2017

(51) Int. Cl.
*F03D 7/02* (2006.01)
*F03D 9/25* (2016.01)

(52) U.S. Cl.
CPC ......... *F03D 7/0296* (2013.01); *F03D 7/0224* (2013.01); *F03D 7/0268* (2013.01); *F03D 9/25* (2016.05); *F03D 7/0276* (2013.01); *F05B 2270/327* (2013.01); *F05B 2270/334* (2013.01); *Y02E 10/723* (2013.01)

(58) Field of Classification Search
CPC .............................. F03D 7/0295; F03D 7/0224
See application file for complete search history.

(56) References Cited

U.S. PATENT DOCUMENTS

| | | | | |
|---|---|---|---|---|
| 6,525,518 B1 * | 2/2003 | Garnaes | ................ | F03D 7/0296 324/207.12 |
| 8,360,723 B2 | 1/2013 | Veldkamp et al. | | |
| 10,107,259 B2 * | 10/2018 | Kristoffersen | ........ | F03D 7/0224 |
| 2010/0301605 A1 * | 12/2010 | Nielsen | ................ | F03D 7/0224 290/44 |

(Continued)

FOREIGN PATENT DOCUMENTS

WO  2015/086023 A1  6/2015

OTHER PUBLICATIONS

International Search Report and Written Opinion issued in connection with corresponding PCT Application No. PCT/US17/033624 dated Jul. 26, 2017.

*Primary Examiner* — Woody A Lee, Jr.
(74) *Attorney, Agent, or Firm* — Dority & Manning, P.A.

(57) ABSTRACT

The present disclosure is directed to a system and method for reducing vortex-induced vibrations of a tower of a wind turbine. The wind turbine has a nacelle mounted atop the tower. The nacelle has a rotor with a rotatable hub having at least one rotor blade mounted thereto. The rotor blade has a first pitch position. Thus, the method includes measuring, via one or more sensors, an acceleration of the nacelle. The method also includes determining a rotor speed of the rotor. Further, the method includes determining a second pitch position for the rotor blade based on the acceleration of the nacelle and the rotor speed and pitching the rotor blade to the second pitch position if the rotor speed is below a speed threshold and the acceleration of the nacelle is above an (Continued)

acceleration threshold. As such, the second pitch position disturbs vortices caused by interactions between the tower and the rotor blade as the rotor blade passes in front of the tower so as to reduce vortex-induced vibrations of the tower.

20 Claims, 5 Drawing Sheets

(56) References Cited

U.S. PATENT DOCUMENTS

| | | | |
|---|---|---|---|
| 2011/0135475 A1* | 6/2011 | Ahmann | F03D 7/0224 |
| | | | 416/61 |
| 2011/0204636 A1* | 8/2011 | Scholte-Wassink | ............ |
| | | | F03D 7/0296 |
| | | | 290/44 |
| 2011/0299986 A1* | 12/2011 | Yoshida | F03D 7/0204 |
| | | | 416/9 |
| 2012/0087792 A1* | 4/2012 | Cousineau | F03D 7/0224 |
| | | | 416/1 |
| 2012/0146331 A1* | 6/2012 | Egedal | F03D 7/0224 |
| | | | 290/44 |
| 2013/0195653 A1* | 8/2013 | Hayashi | F03D 7/0296 |
| | | | 416/1 |

\* cited by examiner

SYSTEM AND METHOD FOR REDUCING VORTEX-INDUCED TOWER VIBRATIONS OF A WIND TURBINE

FIELD OF THE INVENTION

The present disclosures relates generally to wind turbines and, more particularly, to systems and methods for reducing vortex-induced tower vibrations of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle mounted on the tower, and a rotor coupled to the nacelle. The rotor typically includes a rotatable hub and a plurality of rotor blades coupled to and extending outwardly from the hub. The rotor blades capture kinetic energy of wind using known airfoil principles. More specifically, the rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

Each of the rotor blades are generally mounted to hub via a pitch bearing that is configured to rotate an angle of each of the blades with respect to the wind. For example, the rotor blades may be pitched to feather or to power depending on the wind speed near the wind turbine. More specifically, as the wind speed increases from cut-in wind speed to rated speed, the rotor blades are typically pitched to power to maximize energy captured by the wind turbine. As the wind speed increases above rated wind speed, the rotor blades are typically pitched to feather, i.e. towards the incoming wind, via the pitch bearing such that the angle of attack decreases, forces decrease, and power is shed. For many wind turbines, the typical feather blade angle is from about 80 degrees to about 90 degrees.

The feather position for the rotor blades can lead to a very slow rotor idling, e.g. with one blade in front of the tower. In addition, the rotor may be locked with one rotor blade in front of the tower having a pitch angle around the feather position. Such situations can lead to vortex-induced tower vibrations due to interactions between the tower and the feathered rotor blade located in front of the tower.

In view of the aforementioned, the present disclosure provides a system and method for controlling the blade angle of the rotor blade in front of the tower based on tower vibration and/or rotor speed so as to reduce the danger of vortex-induced tower vibrations.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for reducing vortex-induced vibrations of a tower of a wind turbine. The wind turbine has a nacelle mounted atop the tower. The nacelle has a rotor with a rotatable hub having at least one rotor blade mounted thereto. The rotor blade has a first pitch position. Thus, the method includes measuring, via one or more sensors, an acceleration of the nacelle. The method also includes determining a rotor speed of the rotor. Further, the method includes determining a second pitch position for the rotor blade based on the acceleration of the nacelle and the rotor speed. As such, the method also includes pitching the rotor blade to the second pitch position if the rotor speed is below a speed threshold and the acceleration of the nacelle is above an acceleration threshold. Thus, the second pitch position for the rotor blade disturbs vortices caused by interactions between the tower and the rotor blade as the rotor blade passes in front of the tower so as to reduce vortex-induced vibrations of the tower.

In one embodiment, the first pitch position for the rotor blade may correspond to a standard feather position. Thus, in another embodiment, the step of determining the second pitch position for the rotor blade may include reducing the standard feather position to a reduced feather position.

In another embodiment, the method may include verifying that the rotor speed increases and/or the vortex-induced vibrations of the tower decrease in response to reducing the standard feather position to the reduced feather position.

In additional embodiments, the speed threshold may be greater than 0 rotations per minute (RPM) to about 20 RPM. Further, the acceleration threshold may be greater than 0 meters per second squared ($m/s^2$) to about 5 $m/s^2$.

In further embodiments, the step of reducing the standard feather position to the reduced feather position may include reducing the standard feather position from about 20% to about 30%. More specifically, in certain embodiments, the standard feather position may include a pitch angle ranging from about 80 degrees to about 90 degrees, whereas the reduced feather position may include a pitch angle ranging from about 60 degrees to about 70 degrees. For example, in one embodiment, the reduced feather position may include a pitch angle of about 65 degrees.

In yet another embodiment, the one or more sensors may include accelerometers configured to measure the nacelle acceleration. In addition, in certain embodiments, the sensor(s) may be part of a pitch control system of the at least one rotor blade. Further, the pitch control system may also be configured to measure the rotor speed of the rotor.

In additional embodiments, the method may further include measuring the acceleration of the nacelle via one or more accelerometers located at a root of the rotor blade. More specifically, in certain embodiments, the acceleration of the nacelle may be measured using at least two accelerometers per rotor blade which allows the rotor speed and/or the acceleration to be estimated/measured at any time.

In another aspect, the present disclosure is directed to a method for reducing vortex-induced vibrations of a tower of a wind turbine. The wind turbine has a nacelle mounted atop the tower. The nacelle has a rotor with a rotatable hub having at least one rotor blade mounted thereto. The method includes setting a standard feather position for the rotor blade and measuring, via one or more sensors, an acceleration of the nacelle. The method also includes determining a rotor speed of the rotor. If the rotor speed exceeds a speed threshold, the method may include maintaining the standard feather position for the rotor blade. In contrast, if the rotor speed is below the speed threshold and the acceleration of the nacelle exceeds an acceleration threshold, the method includes reducing the standard feather position to a reduced feather position so as to disturb vortices caused by interactions between the tower and the rotor blade as the rotor blade passes in front of the tower, thereby reducing vortex-induced vibrations of the tower.

In yet another aspect, the present disclosure is directed to a system for reducing vortex-induced vibrations of a tower of a wind turbine. The wind turbine has a nacelle mounted atop the tower. The nacelle has a rotor with a rotatable hub having at least one rotor blade mounted thereto. The rotor blade has a first pitch position. The system includes one or more sensors configured to measure an acceleration of the nacelle, a pitch drive mechanism configured with the rotor blade, and a controller communicatively coupled to the one or more sensors and the pitch drive mechanism. Further, the controller is configured to perform one or more operations, including but not limited to determining a rotor speed of the rotor, determining a second pitch position for the rotor blade based on the acceleration of the nacelle and the rotor speed, and pitching the rotor blade to the second pitch position if the rotor speed is below a speed threshold and the acceleration of the nacelle is above an acceleration threshold. Thus, the second pitch position is configured to disturb vortices caused by interactions between the tower and the rotor blade as the rotor blade passes in front of the tower so as to reduce vortex-induced vibrations of the tower.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for reducing vortex-induced vibrations of a tower of a wind turbine. The wind turbine has a nacelle mounted atop the tower. The nacelle has a rotor with a rotatable hub having at least one rotor blade mounted thereto. The rotor blade has a first pitch position. Thus, the method includes measuring, via one or more sensors, nacelle acceleration and determining a rotor speed of the rotor. The method also includes determining a second pitch position for the rotor blade based on the nacelle acceleration and the rotor speed. As such, the method also includes pitching the rotor blade to the second pitch position if the rotor speed is below a speed threshold and the acceleration of the nacelle is above an acceleration threshold, wherein the second pitch position disturbs vortices caused by interactions between the tower and the rotor blade as the rotor blade passes in front (or stays in front) of the tower so as to reduce vortex-induced vibrations of the tower.

The present disclosure provides many advantages not present in the prior art. For example, the system and method of the present disclosure prevents installation issues associated with vortex-induced tower vibrations and reduces loads caused by such vibrations. Further, the present disclosure enables easier certification of a wind turbine since the reduction of vortex-induced tower vibrations needs to be ensured for such certification. More specifically, if the reduction of such vibrations cannot be verified, then the vibrations have to be taken into account during loads simulation and design which increases the costs of the tower and therefore the overall wind turbine.

Figure 1:
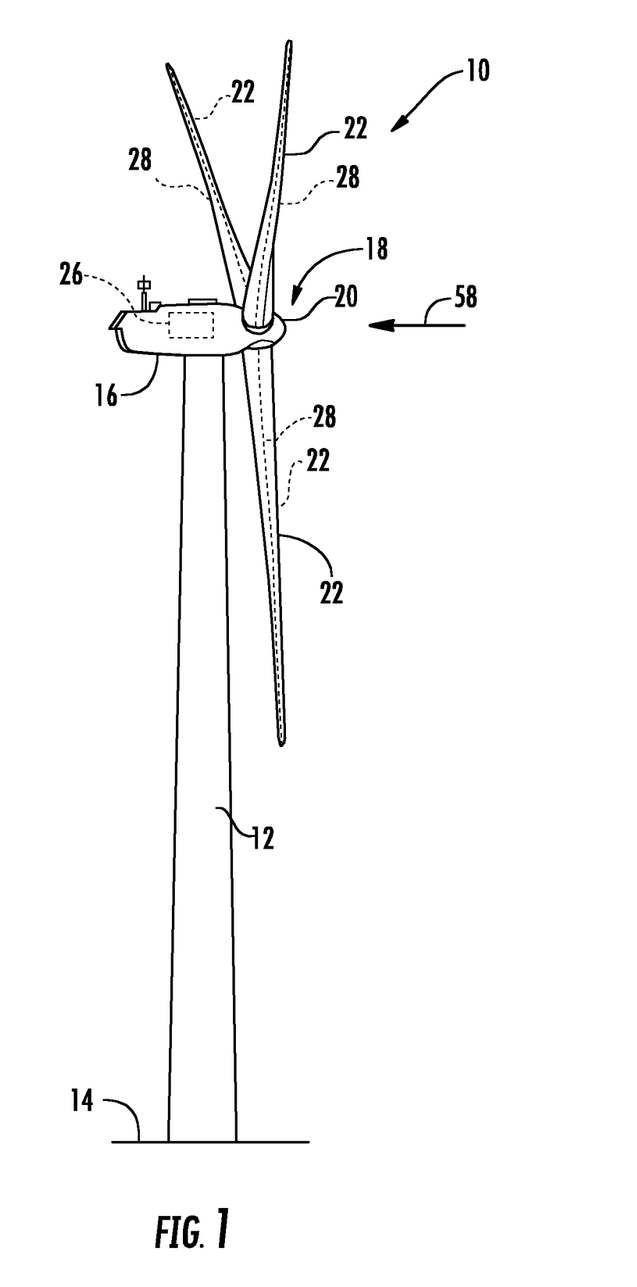
FIG. 1 illustrates a perspective view of one embodiment of a wind turbine according to the present disclosure.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the turbine controller 26 may include a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch control systems or pitch adjustment mechanisms 30 (FIG. 2)

of the wind turbine 10. During operation of the wind turbine 10, the controller 26 may generally control each pitch adjust mechanism 30 in order to alter the pitch angle of each rotor blade 22 between 0 degrees (i.e., a power position of the rotor blade 22) and 90 degrees (i.e., a feathered position of the rotor blade 22). In addition, the turbine controller 26 may control the orientation of the nacelle 16 with respect to the wind direction 58 by transmitting suitable control signals to one or more yaw drive mechanisms 60 that engage a yaw bearing 62 (FIG. 2). Thus, rotation of the yaw bearing 62 about a yaw axis 64 changes the orientation of the nacelle 16.

Figure 2:
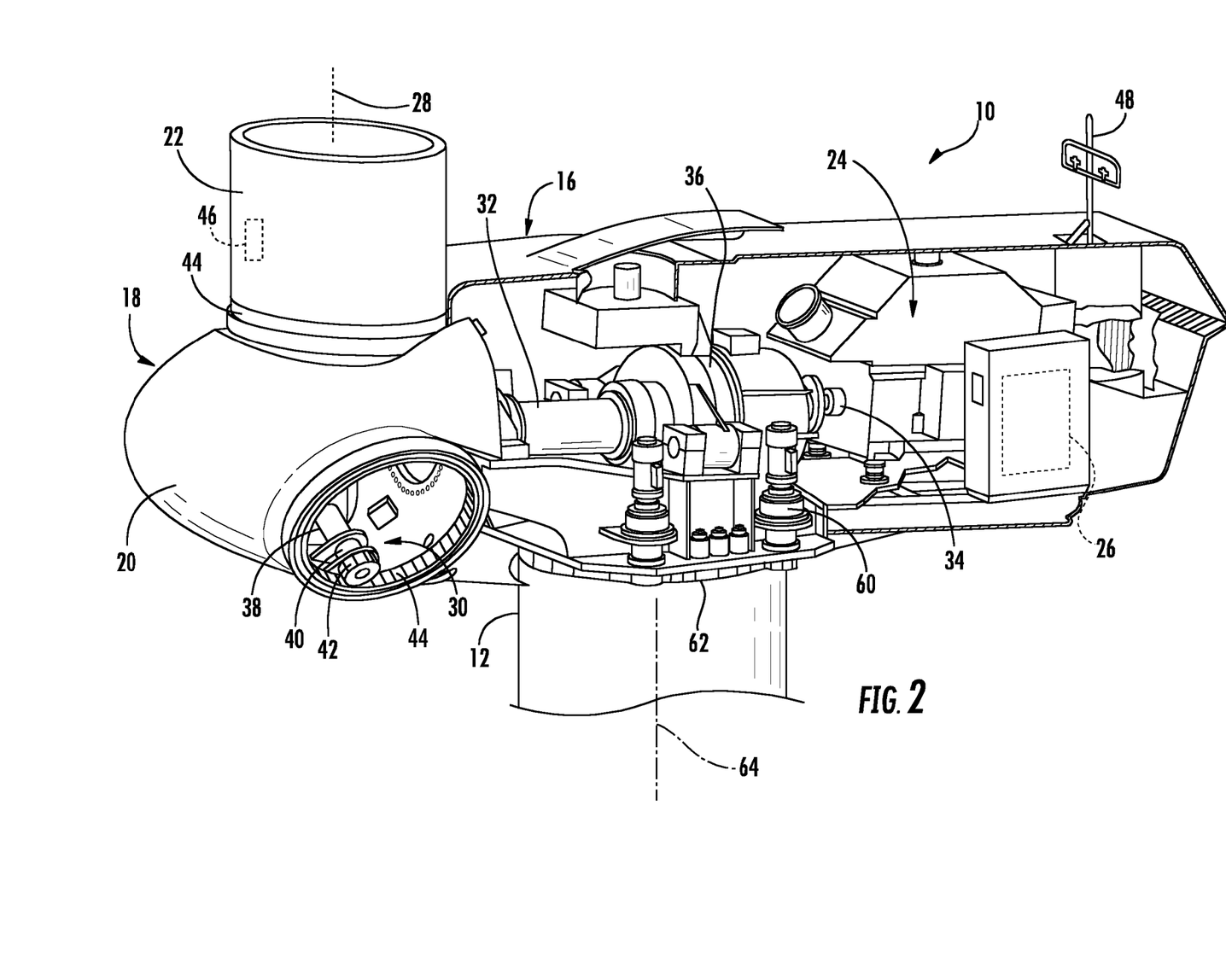
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 30 of the wind turbine 10 (one of which is shown) to facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

In alternative embodiments, it should be appreciated that each pitch adjustment mechanism 30 may have any other suitable configuration that facilitates rotation of a rotor blade 22 about its pitch axis 28. For instance, pitch adjustment mechanisms 30 are known that include a hydraulic or pneumatic driven device (e.g., a hydraulic or pneumatic cylinder) configured to transmit rotational energy to the pitch bearing 44, thereby causing the rotor blade 22 to rotate about its pitch axis 28. Thus, in several embodiments, instead of the electric pitch drive motor 38 described above, each pitch adjustment mechanism 30 may include a hydraulic or pneumatic driven device that utilizes fluid pressure to apply torque to the pitch bearing 44.

Referring still to FIG. 2, the wind turbine 10 may also include a plurality of sensors (e.g. such as sensors 46, 48) for monitoring one or more operating parameters and/or wind conditions of the wind turbine 10. As used herein, a parameter or condition of the wind turbine 10 is "monitored" when a sensor is used to determine its present value. Thus, the term "monitor" and variations thereof are used to indicate that the sensors 46, 48 need not provide a direct measurement of the parameter and/or condition being monitored. For example, the sensors 46, 48 may be used to generate signals relating to the parameter and/or condition being monitored, which can then be utilized by the turbine controller 26 or other suitable device to determine the actual parameter and/or condition. More specifically, in certain embodiments, the sensor(s) 46, 48 may be configured for monitoring the pitch angle of each rotor blade 22, any bending moments on the rotor blades 22, accelerations of the nacelle 16, the speed of the rotor 18 and/or the rotor shaft 32, the speed of the generator 24 and/or the generator shaft 34, the torque on the rotor shaft 32 and/or the generator shaft 34, the wind speed and/or wind direction, and/or any other suitable parameters and/or conditions.

Figure 3:
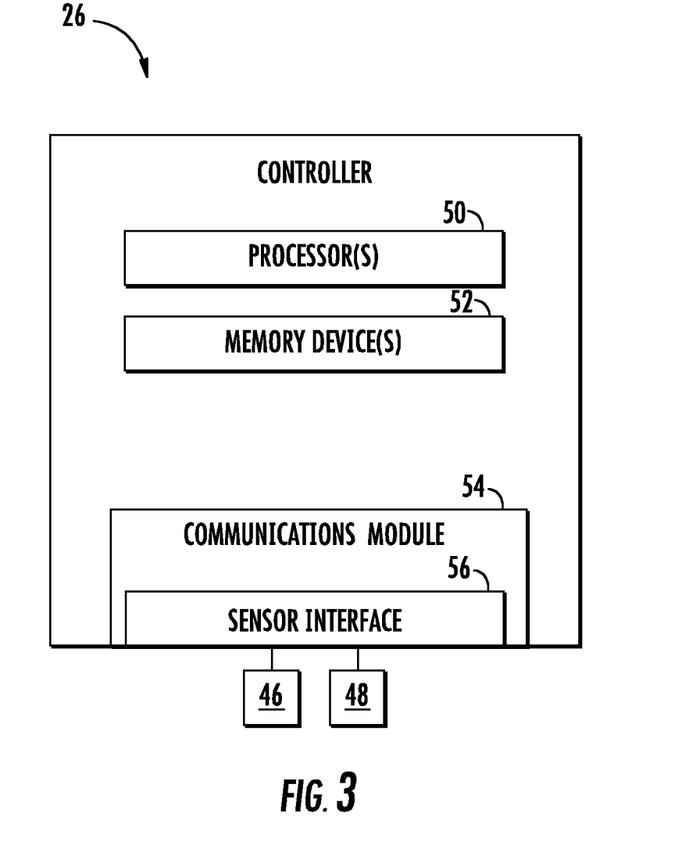
FIG. 3 illustrates a schematic diagram of one embodiment of suitable components that may be included within a turbine controller of a wind turbine according to the present disclosure.

Referring now to FIG. 3, there is illustrated a block diagram of one embodiment of suitable components that may be included within the turbine controller 26 in accordance with aspects of the present disclosure. As shown, the turbine controller 26 may include one or more processor(s) 50 and associated memory device(s) 52 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 52 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 52 may generally be configured to store suitable computer-readable instructions that, when implemented by the processor(s) 50, configure the turbine controller 26 to perform various functions including, but not limited to, transmitting suitable control signals to one or more of the pitch adjustment mechanisms 30, monitoring various parameters and/or conditions of the wind turbine 10 and various other suitable computer-implemented functions.

Additionally, the turbine controller 26 may also include a communications module 54 to facilitate communications between the controller 26 and the various components of the wind turbine 10. For instance, the communications module 54 may serve as an interface to permit the turbine controller 26 to transmit control signals to each pitch adjustment mechanism 30 for controlling the pitch angle of the rotor blades 22. Moreover, the communications module 54 may include a sensor interface 56 (e.g., one or more analog-to-digital converters) to permit signals transmitted from the sensors 46 of the wind turbine 10 to be converted into signals that can be understood and processed by the processors 50.

It should be appreciated that the sensor(s) 46 may be communicatively coupled to the communications module 54 using any suitable means. For example, as shown in FIG. 3, the sensors 46, 48 may be coupled to the sensor interface 56 via a wired connection. However, in other embodiments, the sensors 46, 48 may be coupled to the sensor interface 56 via a wireless connection, such as by using any suitable wireless communications protocol known in the art.

Figure 4:
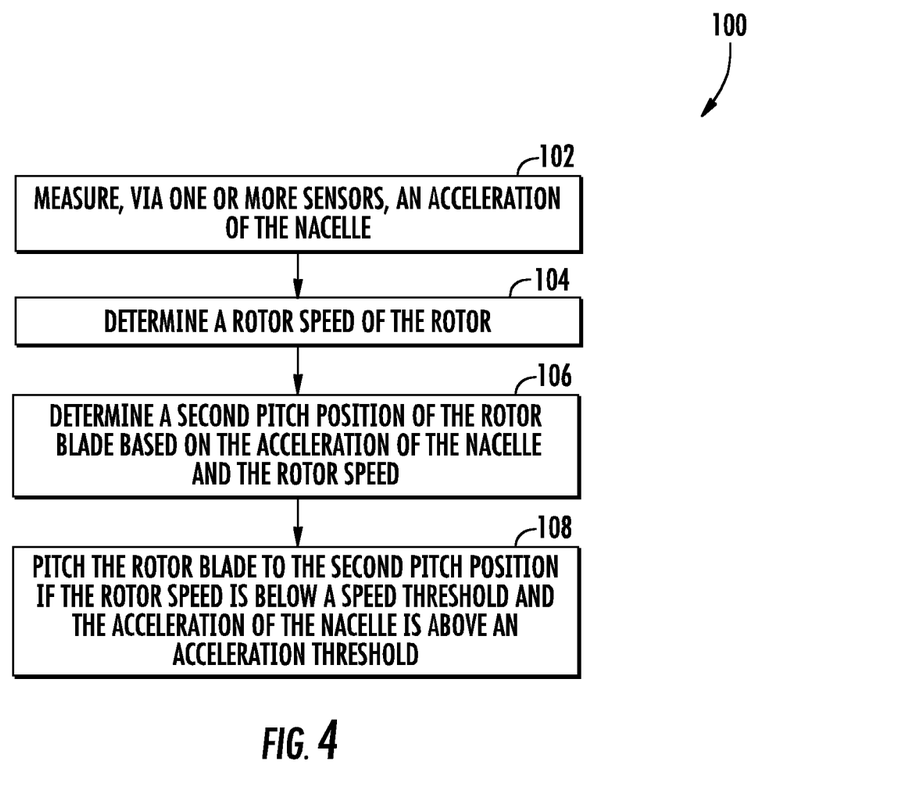
FIG. 4 illustrates a flow diagram of one embodiment of a method for reducing vortex-induced tower vibrations of a wind turbine according to the present disclosure.

Referring now to FIG. 4, there is illustrated a flow diagram of one embodiment of a method 100 for reducing vortex-induced tower vibrations of a wind turbine, e.g. the tower 12 of the wind turbine 10 of FIG. 1. In several embodiments, it should be appreciated that the disclosed method 100 may be performed automatically by the turbine controller 26. For example, the turbine controller 26 may be provided with suitable computer-readable instructions that, when implemented, configure the controller 26 to transmit control signals that implement the method 100. More specifically, as shown at 102, the method 100 may include measuring, via one or more sensors (e.g. sensors 46, 48), an acceleration of the nacelle 16. For example, in one embodiment, the sensor(s) 46, 48 may include accelerometers. In addition, in certain embodiments, the sensor(s) may be part of a pitch control system, such as the pitch drive mechanism 30, of one of the rotor blades 22.

As shown at 104, the method 100 also includes determining a rotor speed of the rotor 18. It should be understood that the rotor speed may be determined using any suitable means. For example, in one embodiment, the rotor speed may be directly measured via one or more sensors, e.g. sensors 46, 48. Alternatively, the rotor speed may be estimated using the controller 26. In such an embodiment, one or more wind sensors (e.g. sensor 48) may measure the wind speed near the wind turbine 10 and the controller 26 may estimate the rotor speed as a function of the measured wind speed.

Referring now to 106, the method 100 also includes determining a second pitch position for the rotor blade 22 based on the nacelle acceleration and the rotor speed. In one embodiment, for example, the second pitch position may correspond to a reduced feather position. As used herein, a feather position may generally correspond to an angle of the rotor blades 22 where the blade 22 faces towards the incoming wind such that the angle of attack decreases, forces decrease, and power is shed. For many wind turbines, a standard feather position or blade angle of the rotor blade(s) 22 is generally from about 80 degrees to about 90 degrees, such as from about 82 degrees to about 89 degrees. As such, in certain embodiments, the feather position may correspond to a first pitch position (i.e. the standard feather position) if the rotor speed is above a rotor speed threshold as speeds above the rotor speed threshold indicate that the wind speed is high enough that interactions between the rotor blade 22 passing in front of the tower 12 (or stopped in front of the tower 12) will not occur.

Alternatively, if the rotor speed is below the speed threshold and the acceleration of the nacelle 16 is above an acceleration threshold, the standard feather position for the rotor blade 22 may be reduced to the second pitch position or a reduced feather position. Thus, as shown at 108, the method 100 may include pitching the rotor blade 22 to the second pitch position if the rotor speed is below a speed threshold and the acceleration of the nacelle is above an acceleration threshold, As such, the reduced feather position disturbs vortices caused by interactions between the tower 12 and the rotor blade 22 as the rotor blade 22 passes in front of the tower 12 so as to reduce vortex-induced vibrations of the tower 12. In addition, if the rotor speed later exceeds the speed threshold and/or the accelerations are below the acceleration threshold, the method may further include returning the pitch position to the first pitch position (i.e. the standard feather position.

More specifically, in certain embodiments, the speed threshold may be greater than 0 rotations per minute (RPM) to about 20 RPM. Further, the acceleration threshold may be greater than 0 meters per second squared (m/s$^2$) to about 5 m/s$^2$. In another embodiment, the direction of the nacelle acceleration may also be considered as the accelerometers may be attached to the blade roots and therefore will be affected by the nacelle acceleration. As such, the direction of the nacelle acceleration may be considered to distinguish in the resultant acceleration in the pitch cards, which is due to the rotation of the rotor, and the acceleration of the complete nacelle.

In further embodiments, the standard feather position may be reduced by about 20% to about 30%. More specifically, as mentioned, the standard feather position may include a pitch angle ranging from about 80 degrees to about 90 degrees, such as from about 82 degrees to about 89 degrees, whereas the reduced feather position may include a pitch angle ranging from about 60 degrees to about 70 degrees. For example, in one embodiment, the reduced feather position may include a pitch angle of about 65 degrees.

In another embodiment, the method 100 may include verifying that the rotor speed increases or the vortex-induced vibrations of the tower 12 decrease in response to reducing the standard feather position to the reduced feather position. For example, in one embodiment, the pitch drive mechanism 30 and/or the controller 26 may be configured to re-measure or estimate the rotor speed while the rotor blade 22 is at the reduced feather position to ensure the reduced feather position actually reduced vortex-induced vibrations. Further, one or more of the sensors 46, 48 may be configured on the tower 12 so as to detect vortex-induced vibrations to ensure that such vibrations are being reduced in response to the reduced feather position.

As indicated above, it should be appreciated that the present disclosure is also directed to a system for reducing vortex-induced tower vibrations of a wind turbine tower 12. Thus, in several embodiments, the system may generally include one or more sensors (e.g. sensors 46, 48) configured to monitor/measure an acceleration of the nacelle 16 of the wind turbine 10 and at least one pitch adjustment mechanism 30 (FIG. 2) configured to pitch the rotor blade 22 about its pitch axis 28.

Additionally, the system may include a controller communicatively coupled to the pitch adjustment mechanism 30 and/or the sensor(s) 46. The controller may include a controller of the pitch adjustment mechanism 30, the turbine controller 26, or a separate controller. Thus, as described above, the controller may be configured to receive signals from the one or more sensors 46, 48 related to the nacelle accelerations of the tower 12, determine a rotor speed of the rotor 18, and determine a feather position of one or more of the rotor blades 22 based on the acceleration of the nacelle 16 and the rotor speed. Thus, as mentioned, the feather position is configured to disturb vortices caused by interactions between the tower 12 and the rotor blade(s) 22 as one of the rotor blades 22 passes in front of the tower 12 so as to reduce vortex-induced vibrations of the tower 12.

Figure 5:
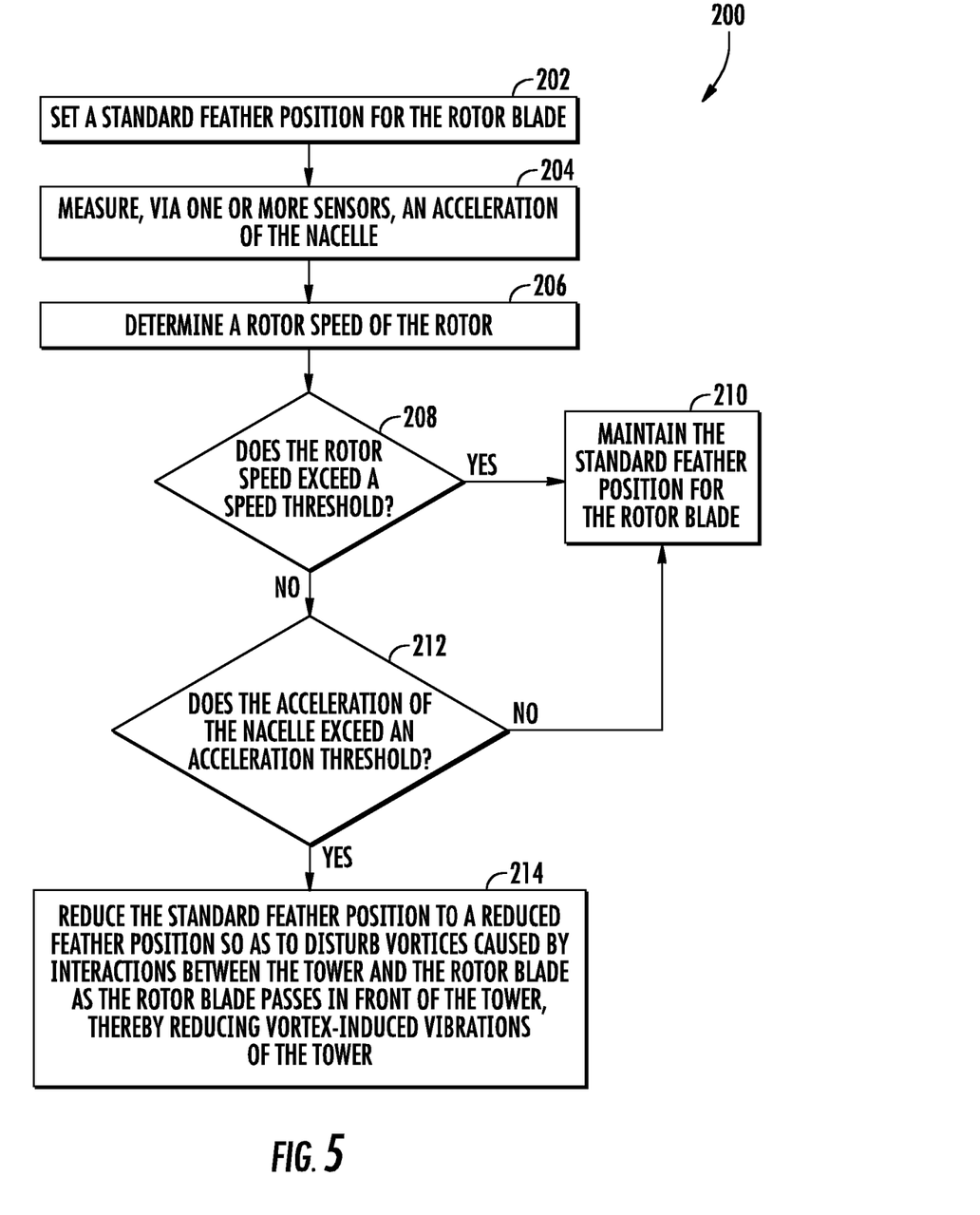
FIG. 5 illustrates a flow diagram of another embodiment of a method for reducing vortex-induced tower vibrations of a wind turbine according to the present disclosure.

Referring now to FIG. 5, a flow diagram of another embodiment of a method 200 for reducing vibrations of the tower 12 of the wind turbine 10 is illustrated. As shown at 202, the method 200 includes setting a standard feather position for one or more of the rotor blades 22. As shown at 204, the method 200 includes measuring, via one or more sensors 46, 48, an acceleration of the nacelle 16. As shown at 206, the method 200 includes determining a rotor speed of the rotor 18 of the wind turbine 10. Further, as shown at 208, the method 200 includes determining whether the rotor speed exceeds a rotor speed threshold as described herein. As shown at 210, if the rotor speed exceeds a speed threshold, the method 200 further includes maintaining the standard feather position for the rotor blade 22. As shown at 212, the method 200 includes determining if the acceleration(s) of the nacelle 16 exceeds an acceleration threshold. If the rotor speed of the rotor 18 and the nacelle acceleration exceed respective thresholds, as shown at 214, the method 200 includes reducing the standard feather position to a reduced feather position so as to disturb vortices caused by interactions between the tower 12 and the rotor blade(s) 22 as one of the rotor blades 22 passes in front of the tower 12, thereby reducing vortex-induced vibrations of the tower 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing vortex-induced vibrations of a tower of a wind turbine, the wind turbine having a nacelle mounted atop the tower, the nacelle having a rotor with a rotatable hub having at least one rotor blade mounted thereto, the rotor blade having a first pitch position, the method comprising:
   measuring, via one or more sensors, an acceleration of the nacelle;
   determining a rotor speed of the rotor;
   determining a second pitch position for the rotor blade based on the acceleration of the nacelle and the rotor speed; and,
   pitching the rotor blade to the second pitch position if the rotor speed is below a speed threshold and the acceleration of the nacelle is above an acceleration threshold, wherein the second pitch position disturbs vortices caused by interactions between the tower and the rotor blade as the rotor blade passes in front of the tower so as to reduce vortex-induced vibrations of the tower.

2. The method of claim 1, wherein the first pitch position corresponds to a standard feather position.

3. The method of claim 2, wherein determining the second pitch position for the rotor blade further comprises reducing the standard feather position to a reduced feather position.

4. The method of claim 3, further comprising verifying that the rotor speed increases or the vortex-induced vibrations of the tower decrease in response to reducing the standard feather position to the reduced feather position.

5. The method of claim 3, wherein the speed threshold comprises from greater than 0 rotations per minute (RPM) to 20 RPM and the acceleration threshold may be greater than 0 meters per second squared (m/s2) to 5 m/s2.

6. The method of claim 3, wherein reducing the standard feather position to the reduced feather position further comprises reducing the standard feather position from 20% to 30%.

7. The method of claim 6, wherein the standard feather position comprises a pitch angle ranging from 80 degrees to 90 degrees, and wherein the reduced feather position comprises a pitch angle ranging from 60 degrees to 70 degrees.

8. The method of claim 7, wherein the reduced feather position comprises a pitch angle of 65 degrees.

9. The method of claim 1, further comprising measuring the acceleration of the nacelle via one or more accelerometers located at a root of the rotor blade.

10. A method for reducing vortex-induced vibrations of a tower of a wind turbine, the wind turbine having a nacelle mounted atop the tower, the nacelle having a rotor with a rotatable hub having at least one rotor blade mounted thereto, the method comprising:
    setting a standard feather position for the rotor blade;
    measuring, via one or more sensors, an acceleration of the nacelle;
    determining a rotor speed of the rotor;
    if the rotor speed exceeds a speed threshold, maintaining the standard feather position for the rotor blade; and,
    if the rotor speed is below the speed threshold and the acceleration of the nacelle exceeds an acceleration threshold, reducing the standard feather position to a reduced feather position so as to disturb vortices caused by interactions between the tower and the rotor blade as the rotor blade passes in front of the tower, thereby reducing vortex-induced vibrations of the tower.

11. A system for reducing vortex-induced vibrations of a tower of a wind turbine, the wind turbine having a nacelle mounted atop the tower, the nacelle having a rotor with a rotatable hub having at least one rotor blade mounted thereto, the rotor blade having a first pitch position, the system comprising:
    one or more sensors configured to measure an acceleration of the nacelle;
    at least one of a pitch drive mechanism configured with the rotor blade; and
    a controller communicatively coupled to the one or more sensors and the pitch drive mechanism, the controller configured to perform one or more operations, the one or more operations comprising:
    determining a rotor speed of the rotor,
    determining a second pitch position for the rotor blade based on the acceleration of the nacelle and the rotor speed, and
    pitching the rotor blade to the second pitch position if the rotor speed is below a speed threshold and the acceleration of the nacelle is above an acceleration threshold, wherein the second pitch position disturbs vortices caused by interactions between the tower and the rotor blade as the rotor blade passes in front of the tower so as to reduce vortex-induced vibrations of the tower.

12. The system of claim 11, wherein the first pitch position corresponds to a standard feather position.

13. The system of claim 12, wherein determining the second pitch position for the rotor blade further comprises reducing the standard feather position to a reduced feather position.

14. The system of claim 13, further comprising verifying that the rotor speed increases or the vortex-induced vibrations of the tower decrease in response to reducing the standard feather position to the reduced feather position.

15. The system of claim 13, wherein the rotor speed threshold comprises from greater than 0 rotations per minute (RPM) to 20 RPM and the acceleration threshold may be greater than 0 meters per second squared (m/s2) to 5 m/s2.

16. The system of claim 13, wherein reducing the standard feather position to the reduced feather position further comprises reducing the standard feather position from 20% to 30%.

17. The system of claim 16, wherein the standard feather position comprises a pitch angle ranging from 80 degrees to 90 degrees, and wherein the reduced feather position comprises a pitch angle ranging from 60 degrees to 70 degrees.

18. The system of claim 17, wherein the reduced feather position comprises a pitch angle of 65 degrees.

19. The system of claim 11, wherein the one or more sensors comprise accelerometers.

20. The system of claim 11, wherein the one or more sensors are part of a pitch control system of the at least one rotor blade.

* * * * *